US008640459B2

(12) United States Patent
Ge et al.

(10) Patent No.: US 8,640,459 B2
(45) Date of Patent: Feb. 4, 2014

(54) TURBOCHARGER CONTROL SYSTEMS AND METHODS FOR IMPROVED TRANSIENT PERFORMANCE

(75) Inventors: Ping Ge, Northville Township, MI (US); Donald R. Meyer, Canton, MI (US)

(73) Assignee: GM Global Technology Operations LLC

( * ) Notice: Subject to any disclaimer, the term of this patent is extended or adjusted under 35 U.S.C. 154(b) by 548 days.

(21) Appl. No.: 12/604,762

(22) Filed: Oct. 23, 2009

(65) Prior Publication Data

US 2011/0094221 A1 Apr. 28, 2011

(51) Int. Cl.
*F02B 33/44* (2006.01)
*F02D 23/00* (2006.01)
*F02B 33/00* (2006.01)

(52) U.S. Cl.
USPC ............................ 60/612; 60/602; 123/562

(58) Field of Classification Search
USPC ................................ 60/612, 602; 123/562
See application file for complete search history.

(56) References Cited

U.S. PATENT DOCUMENTS

| 4,391,098 | A | * | 7/1983 | Kosuge | 60/602 |
|---|---|---|---|---|---|
| 5,154,058 | A | * | 10/1992 | Mizuno | 60/612 |
| 5,950,432 | A | * | 9/1999 | Zimmer et al. | 60/605.1 |
| 6,134,888 | A | * | 10/2000 | Zimmer et al. | 60/600 |
| 7,076,955 | B2 | * | 7/2006 | Herz et al. | 60/612 |
| 7,251,989 | B2 | * | 8/2007 | Baeuerle | 73/114.37 |
| 7,735,320 | B2 | * | 6/2010 | Yanakiev | 60/602 |
| 7,748,217 | B2 | * | 7/2010 | Muller | 60/602 |
| 7,748,218 | B2 | * | 7/2010 | McNulty et al. | 60/612 |
| 7,788,922 | B2 | * | 9/2010 | Muller | 60/602 |
| 8,033,108 | B2 | * | 10/2011 | Ishikawa et al. | 60/602 |
| 8,176,735 | B2 | * | 5/2012 | Komatsu | 60/605.1 |
| 2006/0070381 | A1 | * | 4/2006 | Parlow et al. | 60/612 |
| 2007/0137199 | A1 | * | 6/2007 | Magner et al. | 60/602 |
| 2007/0204615 | A1 | * | 9/2007 | Vrbas | 60/602 |
| 2007/0209362 | A1 | * | 9/2007 | Sun | 60/602 |
| 2007/0295007 | A1 | * | 12/2007 | McNulty et al. | 60/602 |
| 2008/0022679 | A1 | * | 1/2008 | Hara et al. | 60/602 |
| 2008/0053088 | A1 | * | 3/2008 | Yanakiev | 60/602 |
| 2009/0211253 | A1 | * | 8/2009 | Radcliff et al. | 60/670 |
| 2009/0293476 | A1 | * | 12/2009 | Evans | 60/602 |
| 2010/0077745 | A1 | * | 4/2010 | Robinson | 60/602 |
| 2010/0083656 | A1 | * | 4/2010 | Parlow et al. | 60/612 |
| 2010/0300087 | A1 | * | 12/2010 | Liu et al. | 60/602 |
| 2011/0016862 | A1 | * | 1/2011 | Song et al. | 60/602 |
| 2011/0036086 | A1 | * | 2/2011 | Liu et al. | 60/602 |
| 2011/0192161 | A1 | * | 8/2011 | Takahaski et al. | 60/602 |

FOREIGN PATENT DOCUMENTS

JP 02099723 A * 4/1990 ............ F02B 37/12

* cited by examiner

*Primary Examiner* — Thai Ba Trieu
*Assistant Examiner* — Paolo Isada

(57) ABSTRACT

A turbocharger control system for a high-pressure turbocharger and a low-pressure turbocharger includes a turbo mode determination module and a transition control module. The turbo mode determination module determines a transition from a dual turbo mode to a single turbo mode. The high-pressure turbocharger is active in the dual turbo mode and idle in the single turbo mode. The transition control module determines a turbine efficiency of the high-pressure turbocharger and controls the high-pressure turbocharger during the transition based on a predetermined maximum turbine efficiency equation.

10 Claims, 5 Drawing Sheets

TURBOCHARGER CONTROL SYSTEMS AND METHODS FOR IMPROVED TRANSIENT PERFORMANCE

FIELD

The present disclosure relates to internal combustion engines, and more particularly to turbocharger control systems.

BACKGROUND

The background description provided herein is for the purpose of generally presenting the context of the disclosure. Work of the presently named inventors, to the extent that it is described in this background section, as well as aspects of the description that may not otherwise qualify as prior art at the time of filing, are neither expressly nor impliedly admitted as prior art against the present disclosure.

An internal combustion engine may use a turbocharger to increase density of air and consequently the amount of air that enters the engine. The increased amount of air enables more fuel to be injected into the engine, thereby increasing engine power. A turbocharger generally includes a turbine, an air compressor, and a common shaft that connects the turbine to the air compressor. The turbine is driven by exhaust gas that flows from an exhaust manifold. The air compressor is driven by the turbine to compress the air that enters an intake manifold.

SUMMARY

A turbocharger control system for a high-pressure turbocharger and a low-pressure turbocharger includes a turbo mode determination module and a transition control module. The turbo mode determination module determines a transition from a dual turbo mode to a single turbo mode. The high-pressure turbocharger is active in the dual turbo mode and idle in the single turbo mode. The transition control module determines a desired turbine efficiency of the high-pressure turbocharger and controls the high-pressure turbocharger during the transition based on the desired turbine efficiency.

In one feature, the transition control module controls a turbine of the high-pressure turbocharger and a bypass valve during the transition based on the desired turbine efficiency.

In other features, the high-pressure turbocharger is a variable geometry turbocharger (VGT). The desired turbine efficiency is a maximum turbine efficiency based on a given VGT position and a given pressure ratio across the high-pressure turbocharger. The VGT position and the pressure ratio satisfy a predetermined maximum turbine efficiency equation.

A method of operating a high-pressure turbocharger and a low-pressure turbocharger includes: determining a transition from a dual turbo mode to a single turbo mode, wherein the high-pressure turbocharger is active in the dual turbo mode and idle in the single turbo mode; determining a desired turbine efficiency across the high-pressure turbocharger based on the determination of the transition; and controlling a turbine of the high-pressure turbocharger and a bypass valve during the transition based on the desired turbine efficiency.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
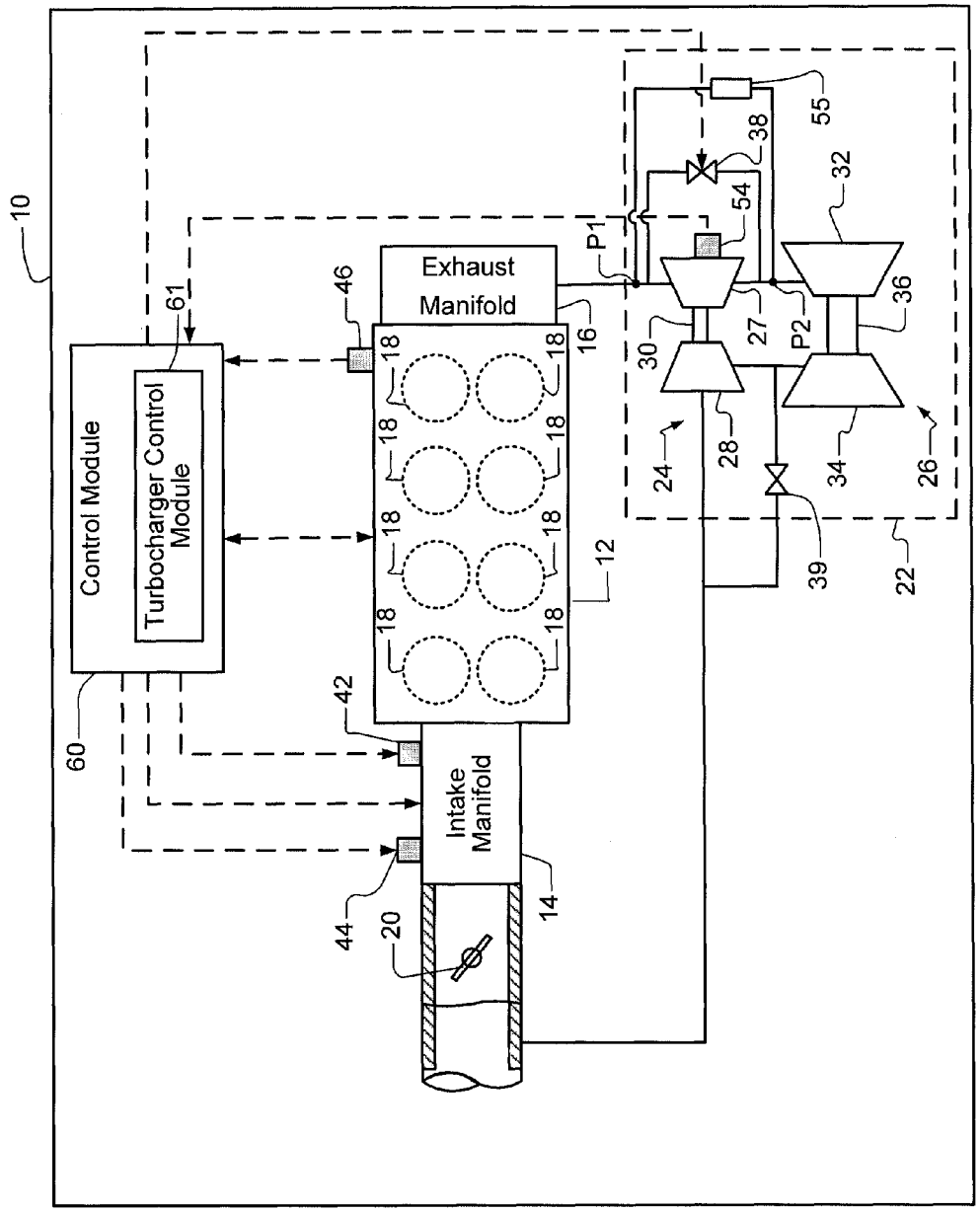
FIG. 1 is a block diagram of an engine system in accordance with the teachings of the present disclosure.

The following description is merely exemplary in nature and is not intended to limit the present disclosure, application, or uses. It should be understood that throughout the drawings, corresponding reference numerals indicate like or corresponding parts and features.

As used herein, the term "module" refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

A turbocharger control system of the present disclosure improves transient performance of a two-stage turbocharger system by maintaining a maximum turbine efficiency during a transition from a dual turbo mode to a single turbo mode. The maximum turbine efficiency is maintained by controlling a bypass valve and a volume flow rate through a turbine of a high-pressure turbocharger.

Referring to FIG. 1, an engine system 10 includes an engine 12, an intake manifold 14, and an exhaust manifold 16. The engine 12 may be a diesel engine and includes a plurality of cylinders 18. While eight cylinders 18 are shown, the engine 12 may include any number of cylinders 18, including but not limited to 2, 4, 5, 6, 10 and 12. A throttle 20 may be optionally provided upstream from the intake manifold 14. Air may be drawn through the throttle 20 into the intake manifold 14 that distributes air to the cylinders 18. When the throttle 20 is not provided, air may be drawn directly into the intake manifold 14. Fuel may be injected into the cylinders 18 by a common rail injection system (not shown) to generate an air/fuel mixture in the cylinders 18. The heat of the cylinders 18 may ignite the air/fuel mixture to result in combustion of the air/fuel mixture. The combustion of the air/fuel mixture generates combustion force to drive pistons (not shown) that rotatably drive a crankshaft (not shown). The exhaust gas exits from the cylinders 18 through the exhaust manifold 16 to an exhaust system (not shown).

A two-stage turbocharger system 22 may communicate with the throttle 20 and the exhaust manifold 16 to provide optimal control of the exhaust gas for recirculation and increase (i.e., boost) the mass air pressure (MAP). When the throttle 20 is not provided, the two-state turbocharger system 22 may communicate with the intake manifold 14 and the exhaust manifold 16. The two-stage turbocharger system 22 includes a high-pressure turbocharger 24 and a low-pressure turbocharger 26 that are connected in series. The high-pressure turbocharger 24 is provided upstream from the low-pressure turbocharger 26 with respect to the direction of the exhaust gas flow. The high-pressure turbocharger 24 includes a high-pressure turbine 27 and a high-pressure compressor 28 that are connected via a common shaft 30. The low-pressure turbocharger 26 includes a low-pressure turbine 32 and a low-pressure compressor 34 that are connected via a common shaft 36. A bypass valve 38 is provided at the side of the high-pressure turbine 27 of the high-pressure turbocharger 24. Another bypass valve 39 is provided to bypass the high-pressure compressor 28 of the high-pressure turbocharger 24.

The two-stage turbocharger system 22 may be operated in a dual turbo mode and a single turbo mode. In the dual turbo mode, the exhaust gas flows through the high-pressure turbocharger 24 and the low-pressure turbocharger 26. The intake air undergoes a higher degree of compression, resulting in a higher degree of boost in the MAP. In the single turbo mode, the bypass valve 38 is opened and the exhaust gas bypasses the high-pressure turbocharger 24. The high-pressure turbocharger 24 becomes idle.

More specifically, when the engine 12 is in a steady-state condition and runs at a relatively high engine speed and torque or when the engine 12 is in "hard acceleration", the shaft speed of the high-pressure turbocharger 24 may be increased close to a design limit. "Hard acceleration" refers to a situation in which a significant amount of load is applied to the engine 12 during acceleration. To reduce the shaft speed of the high-pressure turbocharger 24, exhaust pressure across the high-pressure turbocharger 24 is reduced. The exhaust pressure is reduced by opening a bypass valve 38 to allow the exhaust gas to bypass the high-pressure turbocharger 24 and to flow through the bypass valve 38. When the exhaust gas flow bypasses the high-pressure turbocharger 24, the high-pressure turbocharger 24 becomes idle. The turbocharger system 22 is thus transitioned to the "single turbo mode."

The high-pressure turbocharger 24 may be, for example, a variable geometry turbocharger (VGT) 24 and may include variable inlet guide vanes (not shown) in the turbine 27. When position of the inlet guide vanes (i.e., VGT position) is changed, the geometry of the VGT 24 is changed, so does the volume flow rate through the turbine 27 of the VGT 24. In the following, the VGT 24 is used as the high-pressure turbocharger. However, it is understood and appreciated that any types of turbochargers other than the VGT may be used if the volume flow rate through the high-pressure turbocharger can be adjusted.

The low pressure turbocharger 26 may be, for example, a turbocharger with an internal wastegate (not shown). The wastegate is provided at the side of the low-pressure turbine 32. When the wastegate is opened, excess exhaust gas flows into the exhaust system (not shown) to reduce the boost pressure (i.e., the MAP). Generally, the boost pressure is proportional to the engine speed. When the boost pressure exceeds a threshold pressure at a given engine speed, the wastegate may be opened to reduce the boost pressure to protect the engine 12 and the turbocharger from damage.

A control module 60 communicates with a plurality of sensors and controls the engine operations based on signals from the plurality of sensors. The plurality of sensors include, but are not limited to, a manifold air pressure (MAP) sensor 42, a mass air flow (MAF) sensor 44, an engine speed sensor 46, and a VGT position sensor 54. The MAP sensor 42 measures the MAP. The MAF sensor 44 measures the MAF into the intake manifold 14. The engine speed sensor 46 measures engine speed (RPM). The VGT position sensor 54 is provided at the high-pressure turbine 27 and measures the VGT position of the high-pressure turbine 27.

The control module 60 may include a turbocharger control module 61 that controls operation of the two-stage turbocharger system 22. The turbocharger control module 61 maintains the turbine efficiency at a predetermined turbine efficiency when the turbocharger system 22 is transitioned from the dual turbo mode to the single turbo mode. The predetermined turbine efficiency is a maximum turbine efficiency at a VGT position and a pressure ratio. Therefore, the transient performance of the turbocharger system 22 is improved.

Figure 2:
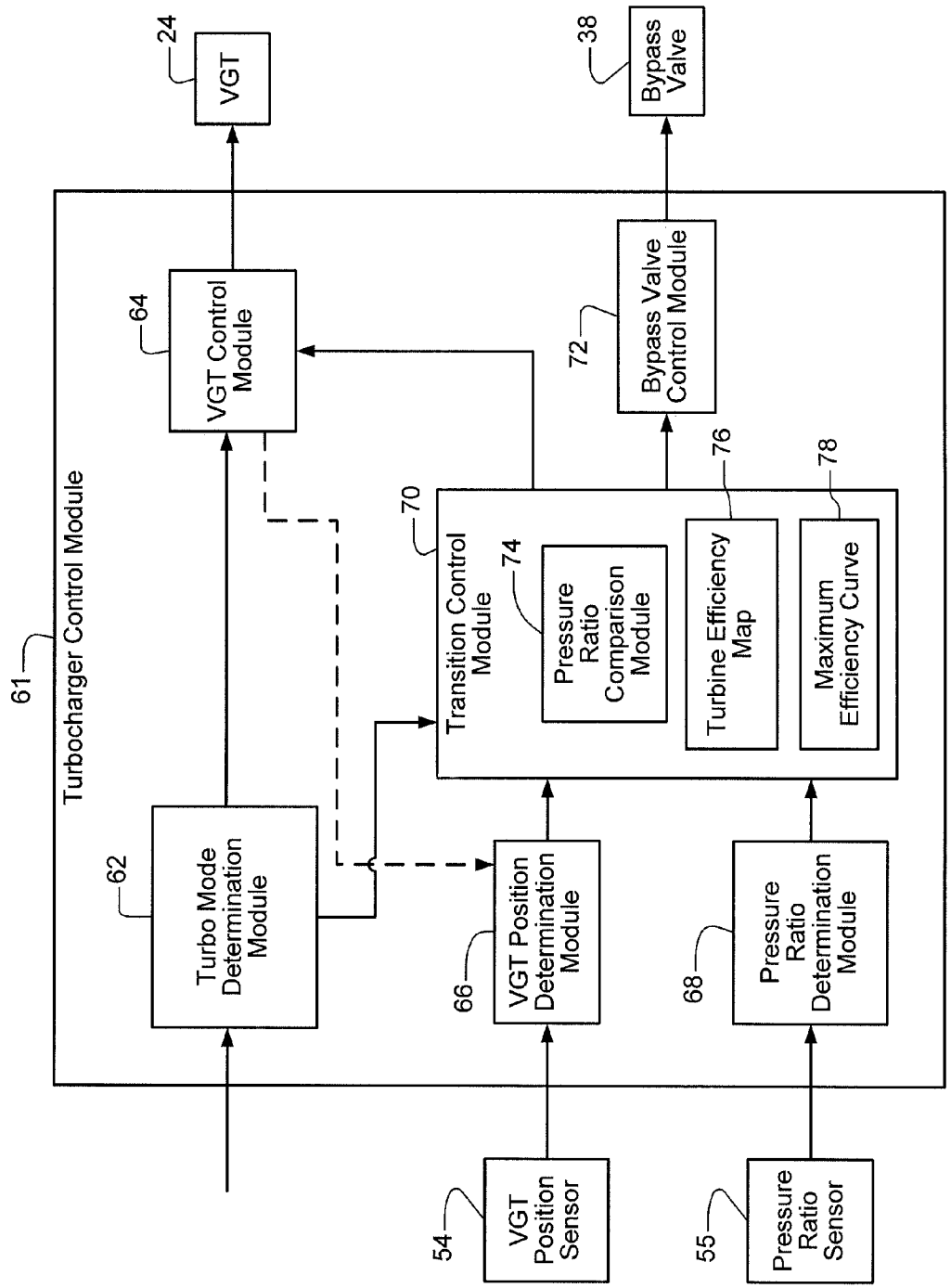
FIG. 2 is a block diagram of a turbocharger control module in accordance with the teachings of the present disclosure.

Referring now to FIG. 2, the turbocharger control module 61 includes a turbo mode determination module 62, a VGT control module 64, a VGT position determination module 66, a pressure ratio determination module 68, a transition control module 70, and a bypass valve control module 72.

The turbo mode determination module 62 determines a desired turbo mode based on engine torque and engine speed. For example, the turbo mode determination module 62 may determine a single turbo mode when the engine speed is equal to or above a threshold speed. The high-pressure turbocharger 24 is active in the dual turbo mode and is idle in the single turbo mode. The turbo mode determination module 62 determines a transition when the desired turbo mode is different from a current turbo mode. When a transition from the dual turbo mode to the single turbo mode is desired, the bypass valve 38 is opened. The exhaust gas bypasses the high-pressure turbocharger 24 and drives the low-pressure turbine 32 only. The high-pressure turbocharger 24 becomes idle. Therefore, the engine torque and the MAP begin to drop when the bypass valve 38 is opened. The transition control module 70 controls the turbocharger system 22 to improve transient performance during transition.

The VGT position determination module 66 determines a VGT position of the turbocharger system 22. The VGT position determines the volume flow rate of the exhaust gas through the turbine 27 of the VGT 24. The VGT position determination module 66 may determine a current VGT position (i.e., a first VGT position) based on signals from the VGT sensor 54. Alternatively, the VGT position determination module 66 may determine the current VGT position based on command signals from the VGT control module 64 to the VGT 24 (as shown in dashed lines).

The pressure ratio determination module 68 determines a pressure ratio across the turbine 27 of the high-pressure turbocharger 24. The pressure ratio is defined as the ratio of a turbine inlet pressure to a turbine outlet pressure. The pressure ratio may be determined using a pressure ratio sensor 55 shown in FIGS. 1 and 2. The pressure ratio determination module 68 may include a turbine map that includes correlations among the pressure ratio, exhaust gas flow rate through the turbine, and a VGT (vane) position. The pressure ratio is a function of the exhaust gas flow rate and the VGT position. The pressure ratio determination module 68 determines the pressure ratio based on the exhaust gas flow rate and the VGT position.

The transition control module 70 includes a pressure ratio comparison module 74, a turbine efficiency map 76, and a maximum turbine efficiency curve 78. The transition control module 70 determines a maximum turbine efficiency to be controlled during the transition. The maximum turbine efficiency is determined based on a given VGT position and a given pressure ratio during transition.

Figure 3:
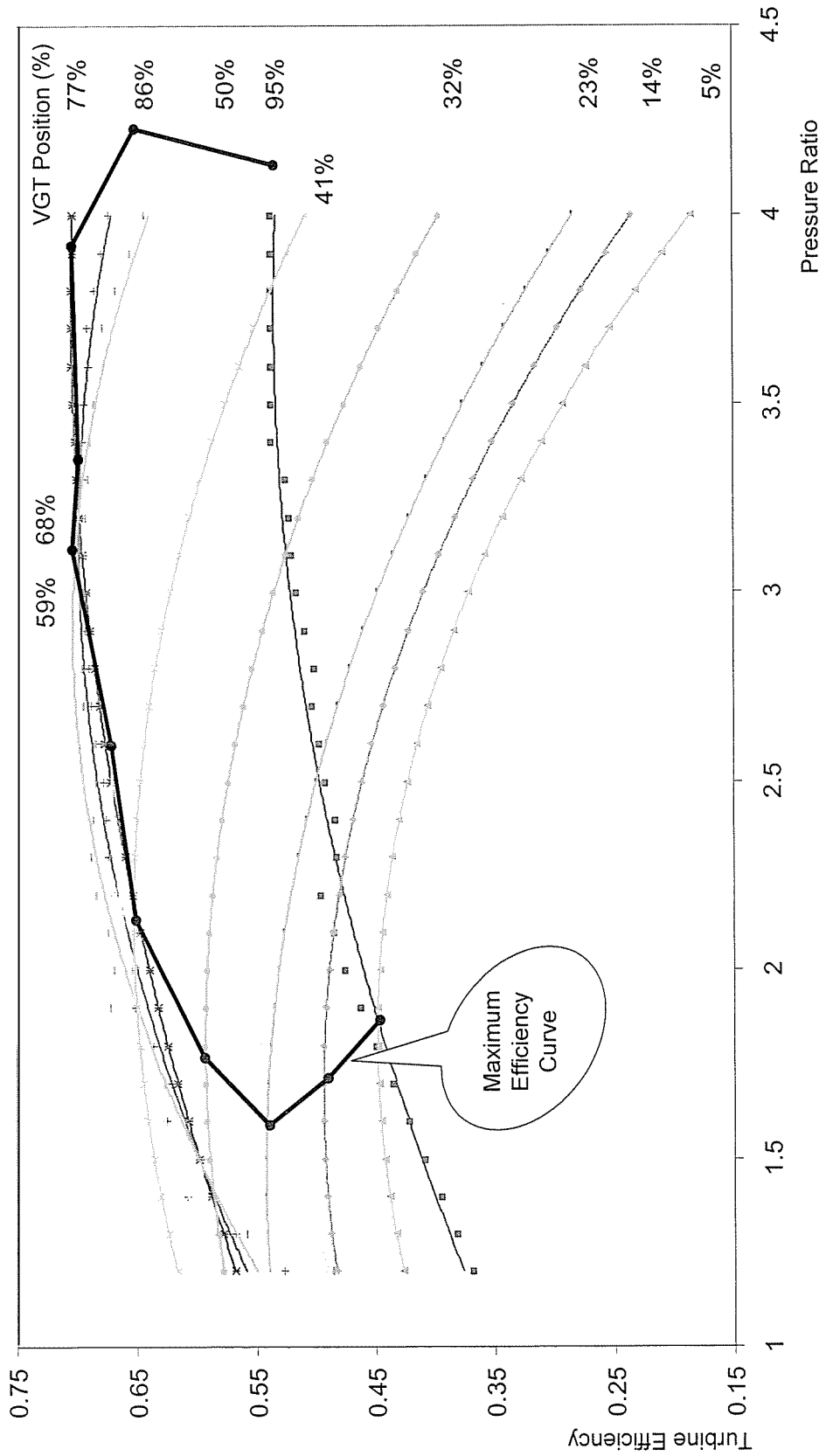
FIG. 3 is an exemplary turbine efficiency map of a high-pressure turbocharger.

Referring to FIG. 3, the turbine efficiency map 76 includes relationship among a pressure ratio, a VGT position, and a turbine efficiency. The VGT position may be described as a percentage of closing of the VGT 24. For example, when the VGT 24 is completely closed, the VGT position may be designated as 100%. When the VGT 24 is completely open, the VGT position may be designated as 0%. The turbine efficiency may be determined based on the turbine efficiency map, the VGT position, and the pressure ratio. The maximum turbine efficiency is the maximum available efficiency for each combination of VGT position and pressure ratio, as indicated by the maximum turbine efficiency curve.

Figure 4:
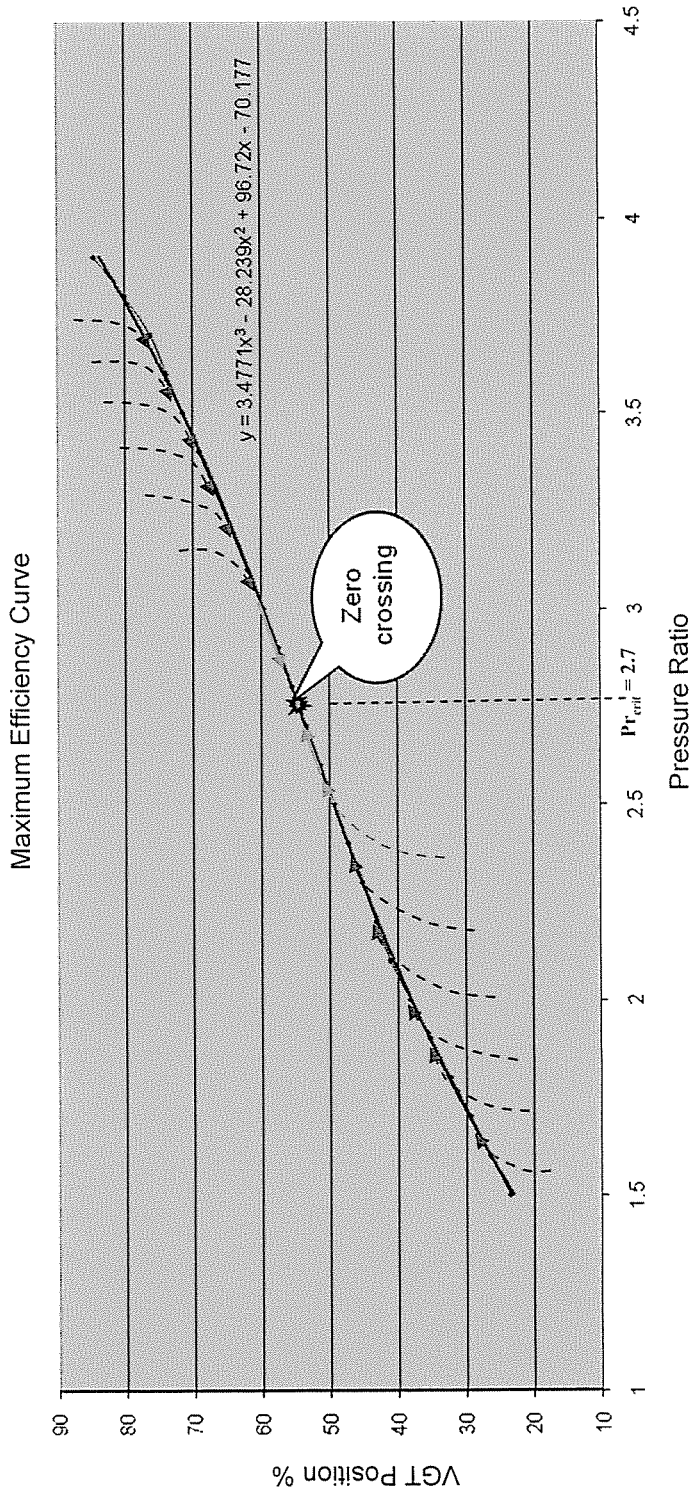
FIG. 4 is a graph of an exemplary maximum turbine efficiency equation.

Referring to FIG. 4, the transition control module 70 performs a coordinate transformation on the maximum turbine efficiency curve to obtain a maximum turbine efficiency curve on a Cartesian coordinate that uses pressure ratio (Pr)) and VGT position ($VGT_{pos}$) as the X-axis and Y-axis, respectively. The pressure ratio and the VGT position throughout the transition satisfy a predetermined relationship, i.e., the maximum turbine efficiency equation. In other words, when the pressure ratio and the VGT position satisfy the maximum turbine efficiency equation, the high-pressure turbocharger 24 generates the maximum turbine efficiency at a given VGT position and a given pressure ratio throughout the transition. When the high pressure turbocharger 24 generates the maximum turbine efficiency available at any given VGT position and pressure ratio throughout the transition, the turbocharger system 22 provides smooth transition from the dual turbo mode to the single turbo mode. The maximum turbine efficiency may vary throughout the transition depending on the VGT position and the pressure ratio.

The predetermined relationship between the pressure ratio and the VGT position (i.e., the maximum turbine efficiency equation) varies with structures of turbocharger systems. For illustrative purposes only, the maximum turbine efficiency equation for one particular turbocharger system design may be described as follows:

$$VGT_{pos}=3.4771Pr^3-28.239Pr^2+96.72Pr-70.177$$

wherein $VGT_{pos}$ is the VGT position and Pr is the pressure ratio.

A zero crossing point may be determined by taking a double derivative of the maximum turbine efficiency equation and setting it to zero. As a non-limiting example, the zero crossing point may occur when the pressure ratio is approximately 2.707 and the VGT position is at approximately 54%. The zero crossing point indicates the threshold where the VGT vane changes directions. When the VGT position and the pressure ratio satisfy the maximum turbine efficiency equation, the combination of the VGT position and the pressure ratio achieves the maximum turbine efficiency.

Referring back to FIG. 2, the pressure comparison module 74 compares the current pressure ratio with a threshold pressure ratio and determines whether the current pressure ratio exceeds the threshold pressure ratio. The threshold pressure ratio may correspond to a mechanical limit of the VGT 24. If the pressure ratio exceeds the threshold pressure ratio, the bypass valve control module 72 opens the bypass valve 38. When the pressure ratio does not exceed the threshold pressure ratio, the pressure ratio determination module 68 continuously determines the pressure ratio. Similarly, the transition control module 70 continuously compares the pressure ratio with the threshold pressure ratio to determine whether the pressure ratio exceeds the threshold pressure ratio.

When the bypass valve 38 is opened, the turbocharger system 22 starts to be transitioned from the dual turbo mode to the single turbo mode. The exhaust gas bypasses the high-pressure turbocharger (i.e., the VGT 24) and flows to the low-pressure turbocharger 26 to drive the low-pressure turbine only. The outlet pressure at the high-pressure turbine 27 starts to decrease, resulting in a decrease in the pressure ratio.

The pressure ratio determination module 68 continuously determines the pressure ratio (i.e., the second pressure ratio) after the bypass valve 38 is opened. The transition control module 70 estimates a desired VGT position (i.e., the second VGT position) based on the second pressure ratio and the maximum turbine efficiency curve. The VGT control module 64 moves the VGT vane position based on the desired VGT position. The desired turbine efficiency is the maximum turbine efficiency that is available at the second VGT position and the second pressure ratio.

When the first VGT position is less than the second VGT position and the second pressure ratio is less than the threshold pressure ratio, the VGT position is increased. When the VGT position is increased, the vanes of the VGT 24 are moved towards the closed position to allow less exhaust to flow through the turbine. When the first VGT position is greater than the second VGT position and the second pressure ratio is greater than the threshold pressure ratio, the VGT position is decreased. When the VGT position is decreased, the vanes of the VGT 24 are moved toward the open position to allow more exhaust flow to flow through the turbine 27 of the VGT 24.

Figure 5:
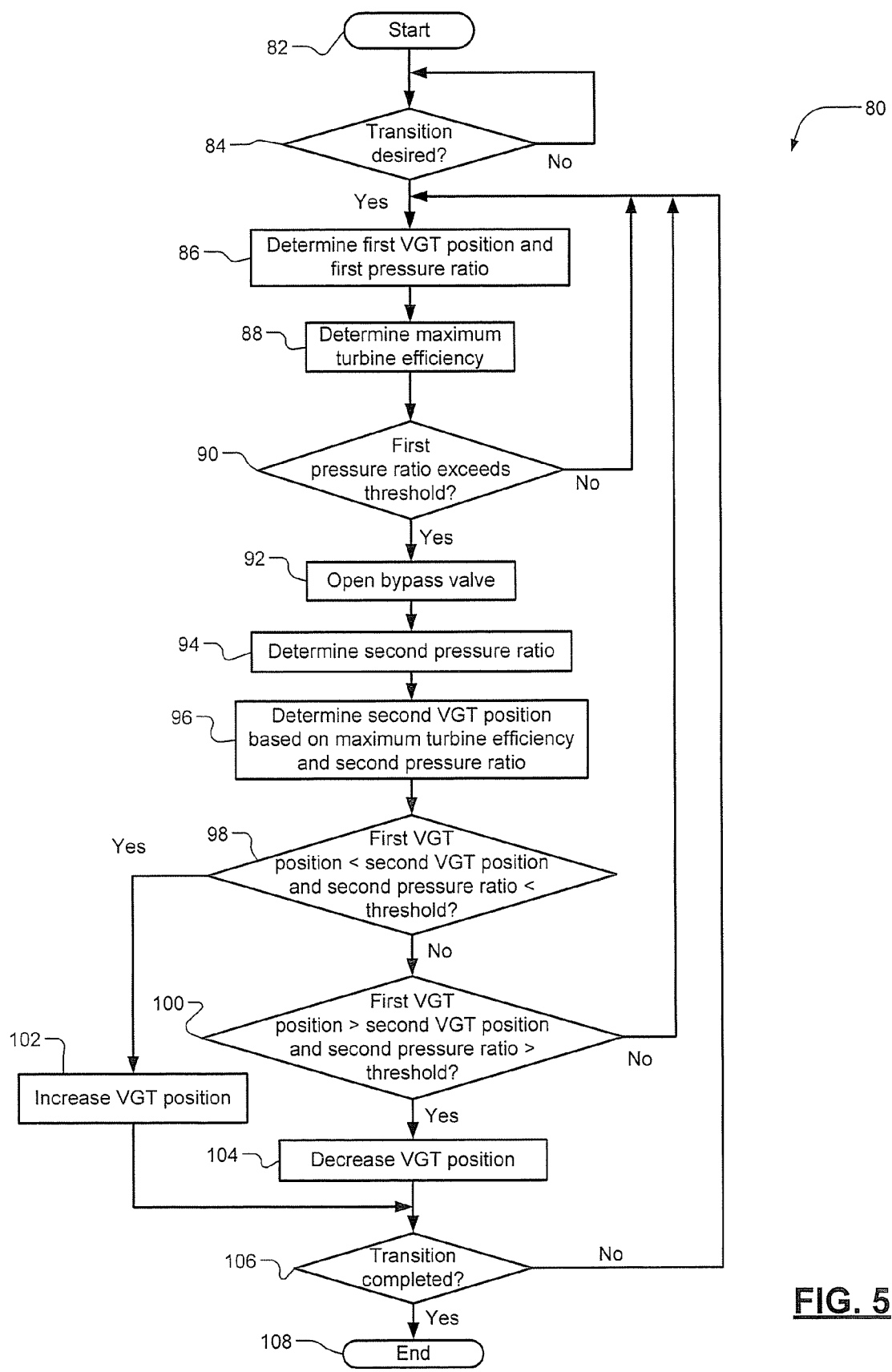
FIG. 5 is a flow diagram of a method of controlling a turbocharger system in accordance with the teachings of the present disclosure.

Referring to FIG. 5, a method 80 of operating a turbocharger system starts in step 82. The turbo mode determination module 62 determines whether a transition from the dual turbo mode to the single turbo mode is desired in step 84. When the transition is desired, the VGT position determination module 66 determine a first (current) VGT position and the pressure ratio determination module 68 determines a first (current) pressure ratio in step 86. The transition control module 70 determines a desired turbine efficiency, which is the maximum turbine efficiency available at the first VGT position and the first pressure ratio in step 88. When the first pressure ratio exceeds the threshold pressure ratio in step 90, the bypass valve 38 is opened in step 92. If the first pressure ratio does not exceed the threshold pressure ratio, the method 80 goes back to step 86 to continue to monitor the turbocharger system 22 and to update the VGT position and pressure ratio.

After the bypass valve 38 is opened, the pressure ratio is decreased. The pressure ratio determination module 68 determines the second pressure ratio in step 94. The transition control module 70 estimates the second VGT position based on the maximum turbine efficiency curve and the second pressure ratio in step 96.

The transition control module 70 compares the first VGT position with the second VGT position and the second pressure ratio with the threshold pressure ratio. When the first VGT position is less than the second VGT position and the second pressure ratio is less than the threshold pressure ratio in step 98, the method 80 goes to step 102 to increase the VGT position. Otherwise, the method 80 goes to step 100. When the VGT position is increased in step 102, the VGT is moved toward the closed position to reduce the exhaust flow through the turbine 27 of the VGT 24.

When the first VGT position is greater than the second VGT position and the second pressure ratio is greater than the threshold pressure ratio in step 100, the VGT position is decreased in step 104. When the VGT position is decreased, the VGT vanes are moved toward the open position to increase exhaust flow through the turbine 27. When the transition is not completed in step 106, the method 80 goes back to step 86 to update the VGT position and the pressure ratio. When the transition is completed in step 106, the method 80 ends in step 108.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, the specification and the following claims.

What is claimed is:

1. A method for operating a turbocharged internal combustion engine system comprising a high-pressure variable geometry turbocharger (VGT), a low-pressure turbocharger used to control air entering an engine, and an electronic circuit controller, the method comprising:
   determining a transition from a dual turbo mode to a single turbo mode, wherein the high-pressure variable geometry turbocharger is active in the dual turbo mode and idle in the single turbo mode;
   determining a desired turbine efficiency across the high-pressure variable geometry turbocharger based on the determination of the transition;
   controlling a turbine of the high-pressure variable geometry turbocharger to maintain the desired turbine efficiency during the transition from the dual turbo mode to the single turbo mode;
   controlling a bypass valve and a volume flow rate through the turbine determined by position of variable inlet guide vanes of the turbine of the high-pressure variable geometry turbocharger,
   wherein the desired turbine efficiency is a predetermined turbine efficiency based on the position of the variable inlet guide vanes and a pressure ratio, and
   wherein the pressure ratio is a ratio of exhaust gas flow rate pressure through a turbine inlet to a turbine outlet of the high-pressure variable geometry turbocharger; and
   opening the bypass valve when the pressure ratio exceeds a threshold pressure.

2. The method of claim 1 further comprising determining a second pressure ratio after the bypass valve is opened and engine torque decreases.

3. The method of claim 2 further comprising determining a second position of the variable inlet guide vanes based on the second pressure ratio and the turbine efficiency.

4. The method of claim 3 wherein the second position and the second pressure ratio satisfy a turbine efficiency equation.

5. A turbocharged internal combustion engine system comprising:
   a high-pressure turbocharger, the high pressure turbocharger including a variable geometry turbocharger (VGT);
   a low-pressure turbocharger used to control air entering an engine; and
   an electronic circuit controller, wherein the electronic circuit controller further comprises:
   a turbo mode determination module that determines a transition from a dual turbo mode to a single turbo mode, wherein the high-pressure variable geometry turbocharger is active in the dual turbo mode and idle in the single turbo mode;
   a transition control module that determines a desired turbine efficiency of the high-pressure variable geometry turbocharger and that controls the high-pressure variable geometry turbocharger to maintain the desired turbine efficiency during the transition from the dual turbo mode to the single turbo mode; and
   a bypass valve control module that controls a bypass valve and a volume flow rate through a turbine of the high-pressure variable geometry turbocharger, the volume flow rate being determined by position of variable inlet guide vanes of the turbine of the high-pressure variable geometry turbocharger,
   wherein the desired turbine efficiency is a predetermined turbine efficiency based on the position of the variable inlet guide vanes and a pressure ratio,
   wherein the pressure ratio is a pressure ratio of exhaust gas flow rate pressure through a turbine inlet to a turbine outlet of the high-pressure variable geometry turbocharger, and
   wherein the bypass valve control module opens the bypass valve when the pressure ratio exceeds a threshold pressure.

6. The turbocharged internal combustion engine system of claim 5 further comprising a pressure ratio determination module that determines a second pressure ratio after the bypass valve is opened and engine torque decreases.

7. The turbocharged internal combustion engine system of claim 6 further comprising a position determination module that determines a second position of the variable inlet guide vanes based on the second pressure ratio and the turbine efficiency.

8. The turbocharged internal combustion engine system of claim 7 further comprising a VGT control module that controls the high-pressure variable geometry turbocharger based on the second position.

9. The turbocharged internal combustion engine system of claim 8 wherein the second position and the second pressure ratio satisfy a turbine efficiency equation.

10. The turbocharged internal combustion engine system of claim 5 wherein values of the position of the variable inlet guide vanes and the pressure ratio prior to and after opening the bypass valve satisfy a polynomial equation of the turbine efficiency to maintain the predetermined turbine efficiency throughout the transition from the dual turbo mode to the single turbo mode and to provide a smooth transition from the dual turbo mode to the single turbo mode.

* * * * *